(12) United States Patent
Chevrier et al.

(10) Patent No.: US 10,063,691 B1
(45) Date of Patent: *Aug. 28, 2018

(54) DETECTING DIAL TONE ON A TELEPHONE LINE

(71) Applicant: Sorenson IP Holdings, LLC, Salt Lake City, UT (US)

(72) Inventors: Brian Chevrier, Highland, UT (US); Michael S. Stimpson, Taylorsville, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/334,251

(22) Filed: Oct. 25, 2016

Related U.S. Application Data

(63) Continuation of application No. 15/198,841, filed on Jun. 30, 2016, now Pat. No. 9,503,568.

(51) Int. Cl.
 *H04M 3/00* (2006.01)
 *H04M 3/22* (2006.01)
 *H04M 1/82* (2006.01)

(52) U.S. Cl.
 CPC .......... *H04M 3/2272* (2013.01); *H04M 1/82* (2013.01)

(58) Field of Classification Search
 CPC .............................. H04M 1/82; H04M 3/2272
 USPC ................................................... 379/372–386
 See application file for complete search history.

(56) References Cited

U.S. PATENT DOCUMENTS

| | | | |
|---|---|---|---|
| 3,670,111 A | 6/1972 | Bukosky et al. | |
| 4,737,984 A | 4/1988 | Brown | |
| 4,747,131 A * | 5/1988 | Beirne | H04Q 1/457 379/372 |
| 4,777,469 A | 10/1988 | Engelke et al. | |
| 4,959,847 A | 9/1990 | Engelke et al. | |
| 5,029,197 A | 7/1991 | Hashimoto | |
| 5,081,673 A | 1/1992 | Engelke et al. | |
| 5,325,417 A | 6/1994 | Engelke et al. | |
| 5,327,479 A | 7/1994 | Engelke et al. | |
| 5,327,494 A | 7/1994 | Gifford | |
| 5,351,288 A | 9/1994 | Engelke et al. | |
| 5,432,837 A | 7/1995 | Engelke et al. | |
| 5,442,696 A | 8/1995 | Lindberg et al. | |

(Continued)

FOREIGN PATENT DOCUMENTS

WO  2000030325 A1  5/2000

OTHER PUBLICATIONS

Gunter Schmer, "DTMF Tone Generation and Detection: An Implementation Using the TMS320C54x", Texas Instrument Application Report, May 2000, 19 pages.

(Continued)

*Primary Examiner* — Hemant Patel
(74) *Attorney, Agent, or Firm* — Maschoff Brennan

(57) ABSTRACT

A method to detect dial tone on a telephone line may include taking samples of incoming audio on a telephone line. The method may also include determining volumes of the samples. The method may further include determining whether the volumes of a threshold number of the samples are at or above a threshold volume. The method may also include, in response to determining that the volumes of a threshold number of the samples are at or above a threshold volume, determining that the incoming audio on the telephone line includes a dial tone.

20 Claims, 6 Drawing Sheets

(56) References Cited

U.S. PATENT DOCUMENTS

| | | | |
|---|---|---|---|
| D364,865 S | 12/1995 | Engelke et al. | |
| 5,581,593 A | 12/1996 | Engelke et al. | |
| 5,604,786 A | 2/1997 | Engelke et al. | |
| 5,642,406 A | 6/1997 | Gahang | |
| 5,687,222 A | 11/1997 | McLaughlin et al. | |
| 5,724,405 A | 3/1998 | Engelke et al. | |
| 5,809,425 A | 9/1998 | Colwell et al. | |
| 5,909,482 A | 6/1999 | Engelke | |
| 5,937,334 A * | 8/1999 | Peterson | H04M 1/725 379/442 |
| 5,974,116 A | 10/1999 | Engelke et al. | |
| 5,978,654 A | 11/1999 | Colwell et al. | |
| 6,072,869 A * | 6/2000 | Becker | H04M 1/82 379/350 |
| 6,075,842 A | 6/2000 | Engelke et al. | |
| 6,173,054 B1 | 1/2001 | Beyda et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,560,331 B1 | 5/2003 | Cooklev et al. | |
| 6,594,346 B2 | 7/2003 | Engelke | |
| 6,603,835 B2 | 8/2003 | Engelke et al. | |
| 6,882,707 B2 | 4/2005 | Engelke et al. | |
| 6,885,731 B2 | 4/2005 | Engelke et al. | |
| 7,660,398 B2 | 2/2010 | Engelke et al. | |
| 7,881,441 B2 | 2/2011 | Engelke et al. | |
| 8,761,916 B2 | 6/2014 | Letunovskiy et al. | |
| 9,350,857 B1 | 5/2016 | Engelke et al. | |
| 9,503,568 B1 * | 11/2016 | Chevrier | H04M 1/82 |
| 2002/0076034 A1 | 6/2002 | Prabhu et al. | |
| 2003/0123647 A1 | 7/2003 | Itoh | |
| 2009/0103688 A1 | 4/2009 | Cabelli | |
| 2009/0186574 A1 | 7/2009 | Maor et al. | |

OTHER PUBLICATIONS

Ian H. Merritt, "Providing Telephone Line Access to a Packet Voice Network", University of Southern California, Feb. 1983, 22 pages.

* cited by examiner

DETECTING DIAL TONE ON A TELEPHONE LINE

CROSS-REFERENCE TO RELATED APPLICATION

This patent application is a continuation of U.S. patent application Ser. No. 15/198,841, filed Jun. 30, 2016, which is incorporated herein by reference.

FIELD

The embodiments discussed herein are related to detecting dial tone on a telephone line.

BACKGROUND

A dial tone is a telephony signal that is typically sent on a telephone line by a telephone exchange as an incoming signal to a terminating device, such as a telephone, when an off-hook condition is detected on the telephone line. An off-hook condition is the state of a telephone line that allows dialing and transmission and/or other activity such as answering an incoming telephone call and generally occurs when a terminating device, such as a telephone, is selected for use such as by lifting a handset off of a base, pressing a speakerphone button, or pressing a talk button, for example. The dial tone indicates that the exchange is working and is ready to accept an outgoing telephone call initiated by a terminating device such as a telephone. The dial tone typically terminates when the first dialed digit from the telephone is recognized by the exchange. Therefore, when a human user hears a dial tone on a telephone line, the user can generally begin dialing a telephone number with confidence that the telephone line is available for initiation of an outgoing telephone call.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to detect dial tone on a telephone line may include taking samples of incoming audio on a telephone line. The method may also include determining volumes of the samples. The method may further include determining whether the volumes of a threshold number of the samples are at or above a threshold volume. The method may also include, in response to determining that the volumes of a threshold number of the samples are at or above a threshold volume, determining that the incoming audio on the telephone line includes a dial tone.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
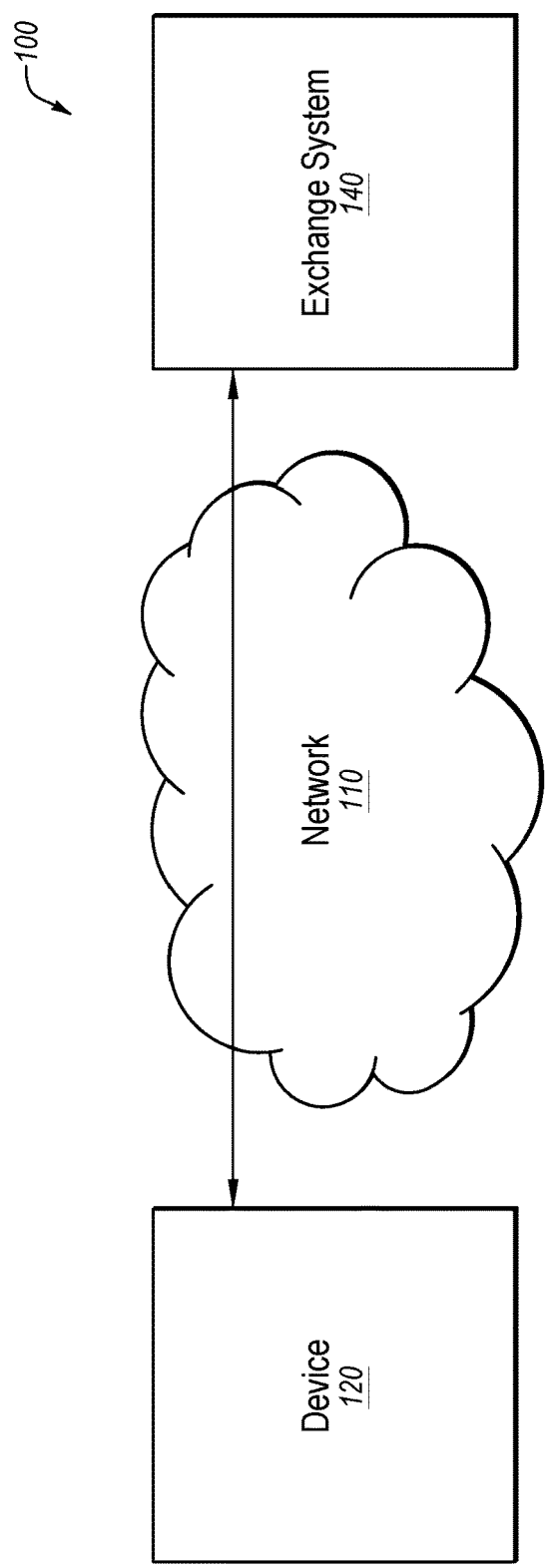
FIG. 1 illustrates an example system configured to detect dial tone on a telephone line.

Some embodiments in this disclosure relate to a device or system that may be configured to detect dial tone on a telephone line. In at least some embodiments, the device or system may detect a dial tone on a telephone line in order, for example, to enable automated equipment to initiate an outgoing telephone call or other communication session on the telephone line.

For example, in some embodiments, a system that includes automated equipment may be employed to initiate an outgoing telephone call on a telephone line. The automated equipment may wait until a dial tone is detected on the telephone line before attempting to initiate the outgoing telephone call.

One common problem with dial tones may be accurately detecting a dial tone where automated equipment is employed instead of, or in addition to, a human user in the initiation of an outgoing telephone call. For example, automated equipment, such as a telephone used by a hearing-impaired user, may be configured to detect a dial tone by attempting to detect tones having a frequency or frequencies of a standard dial tone. However, automated equipment may often fail to detect a non-standard dial tone, even where the non-standard dial tone is a valid dial tone. Where automated equipment fails to detect a valid dial tone on a telephone line, the automated equipment may fail to initiate an outgoing telephone call even where the telephone line is actually available for initiation of an outgoing telephone call.

The systems and methods disclosed herein may provide various benefits. In particular, the systems and methods disclosed herein may increase the accuracy of detecting a valid dial tone. For example, a standard dial tone in North America may be a dial tone as specified in the Precise Tone Plan specification for the North American network (the "Precise Tone Plan"), which defines a dial tone to be a continuous tone having frequencies of 350 and 440 Hz at a level of −13 dBm, and the systems and methods may be employed to detect this standard dial tone in North America. Other countries may have other standard dial tones, such as a dial tone having a frequency of 425 Hz, which is employed in most of Europe. Furthermore, while the systems and methods disclosed herein may detect a standard dial tone, the systems and methods disclosed herein may also detect a non-standard dial tone. For example, a non-standard dial tone may be a stutter dial tone (which is a non-continuous tone, and may sometimes be used to indicate reception of a new voicemail, for example), may be a dial tone that has a volume that is less than the volume of a standard dial tone, or may be a dial tone that includes a musical tune, or some combination thereof. While non-standard dial tones may not conform to a standard specification, such as the Precise Tone Plan, these non-standard dial tones may nevertheless be valid dial tones, and the ability of the systems and methods disclosed herein to recognize these non-standard dial tones as valid dial tones may be beneficial over other systems that are only able to recognize standard dial tones by, among other things, analyzing the frequency or frequencies of the incoming audio on a telephone line.

Turning to the figures, FIG. 1 illustrates an example system 100 configured to detect dial tone on a telephone line. The system 100 may be arranged in accordance with at least one embodiment described in the present disclosure. The system 100 may include a network 110, a device 120, and an exchange system 140.

The network 110 may be configured to communicatively couple the device 120 and the exchange system 140. In some embodiments, the network 110 may be any network or configuration of networks configured to send and receive communications between systems and devices. In some embodiments, the network 110 may include a conventional type network, a wired or wireless network, and may have numerous different configurations. In some embodiments, the network 110 may also be coupled to or may include portions of a telecommunications network, including telephone lines, for sending data in a variety of different communication protocols, such as a plain old telephone system (POTS).

The device 120 may be any electronic or digital computing device. For example, the device 120 may include a desktop computer, a laptop computer, a smartphone, a mobile phone, a tablet computer, a telephone, a phone console, or any other computing device. In some embodiments, the device 120 may be configured to establish communication sessions with other devices. For example, the device 120 may be configured to establish an outgoing telephone call with another device over a telephone line. Alternately or additionally, the device 120 may be configured to communicate with other systems over a network, such as the network 110 or another network such as the network 640 of FIG. 6. In these and other embodiments, the device 120 may receive data from and send data to the exchange system 140. For example, the device 120 may include memory and at least one processor, which are configured to perform operations as described in this disclosure, among other operations. In some embodiments, the device 120 may include computer-readable-instructions that are configured to be executed by the device 120 to perform operations described in this disclosure.

In some embodiments, the exchange system 140 may include any configuration of hardware, such as processors, servers, and databases that are networked together and configured to perform a task. For example, the exchange system 140 may include multiple computing systems, such as multiple servers that each include memory and at least one processor, which are networked together and configured to perform operations of a telephone exchange configured to establish telephone calls between devices such as the device 120 and another device as described in this disclosure, among other operations. In some embodiments, the exchange system 140 may include computer-readable-instructions that are configured to be executed by the exchange system 140 to perform operations described in this disclosure.

Modifications, additions, or omissions may be made to the system 100 without departing from the scope of the present disclosure. For example, in some embodiments, the system 100 may include additional devices similar to the device 120. In these and other embodiments, the similar devices may be configured to detect dial tone on a telephone line.

Figure 2:
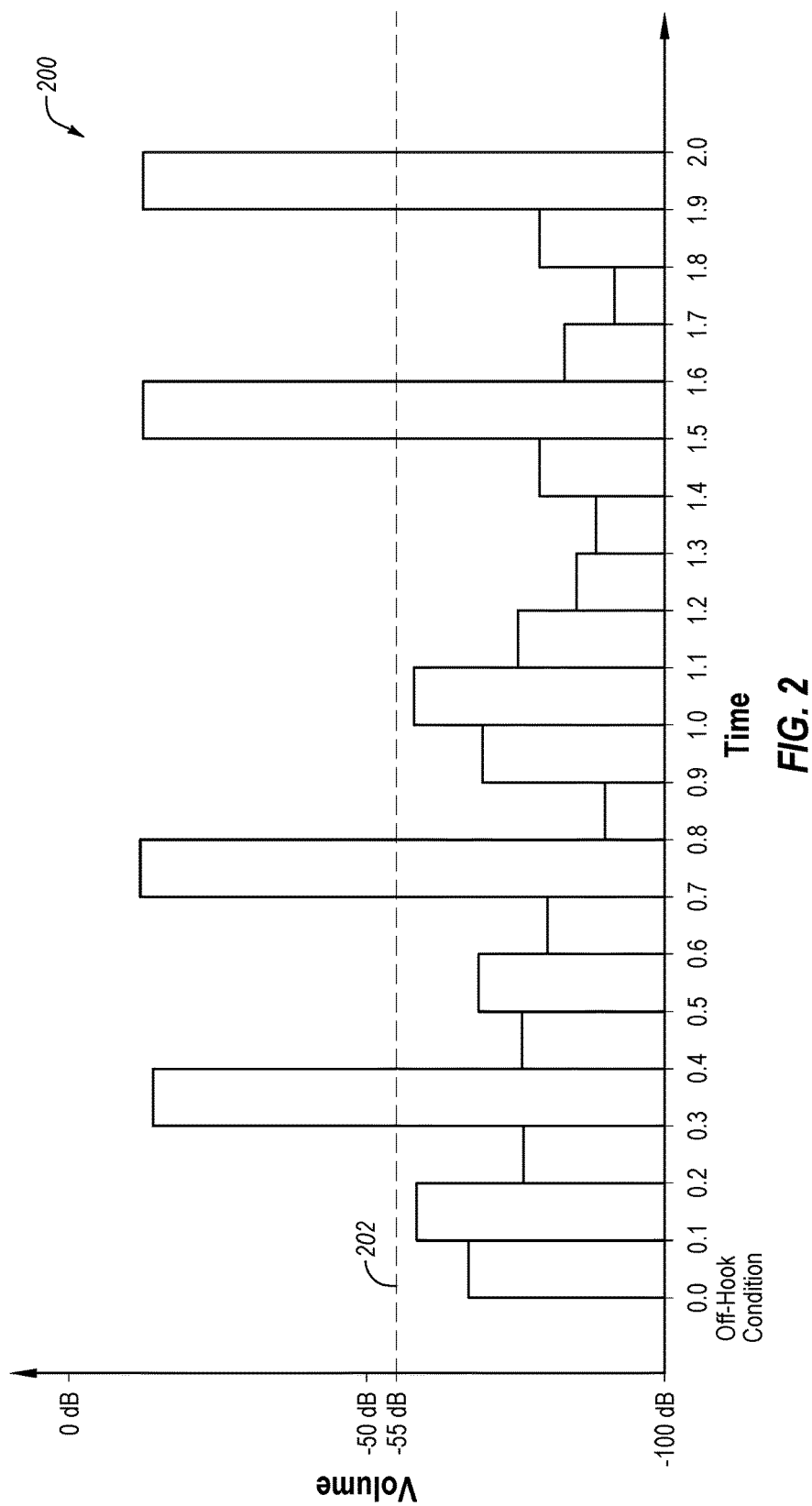
FIGS. 2 and 3 illustrate example volume determinations in a system configured to detect dial tone on a telephone line.
Figure 3:
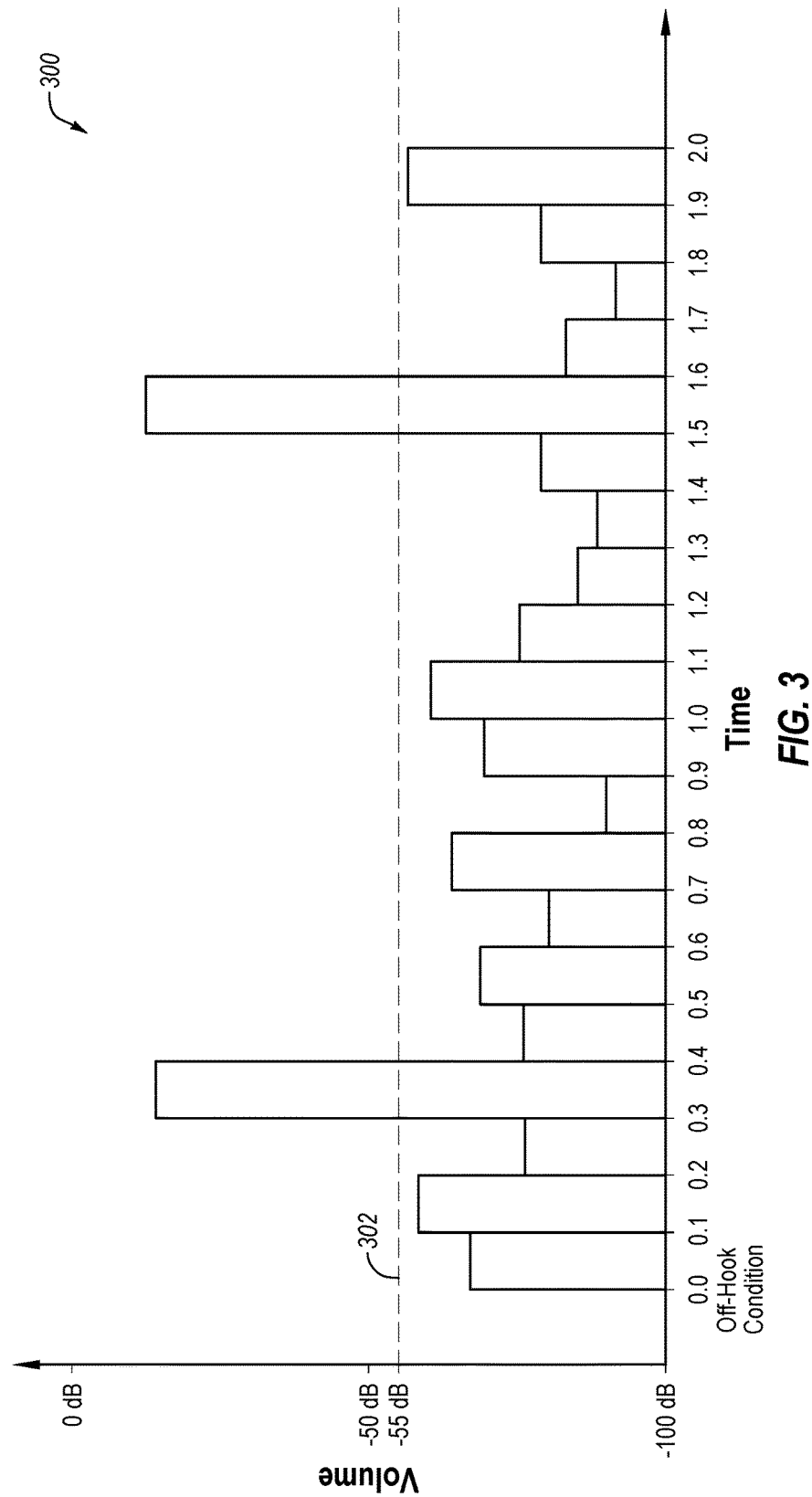

FIGS. 2 and 3 illustrate example volume determinations 200 and 300 in a system configured to detect dial tone on a telephone line. The volume determinations 200 and 300 may be made in accordance with at least one embodiment described in the present disclosure. The volume determination 200 and 300 may be made by the device 120 of FIG. 1, or by some other system or device. For example, the volume determinations 200 and 300 may be made by an external system, with audio being sent to the external system by the device 110 or the external system 140 of FIG. 1, and with results being sent to the device 110. In some embodiments, the volume determinations 200 and 300 illustrated are not exhaustive but are merely representative of volume determinations that may occur. Furthermore, one volume determination as illustrated may represent one or more determinations, measurements, calculations, or estimations, or some combination thereof.

With reference to FIGS. 1, 2, and 3, in these and other embodiments, an application may be running on the device 120 that may perform operations by the device 120 on incoming audio from the exchange system 140 on a telephone line. In these and other embodiments, the application may be a specific application running on the device 120. In these and other embodiments, once an off-hook condition is detected on a telephone line, samples may be taken of incoming audio on the telephone line. A predetermined number of the samples, such as about twenty, may be taken with each of the samples having a predetermined length, such as about one-tenth of one second (i.e., twenty samples each having a length of 0.1 seconds may be taken for 2.0 seconds from the point in time that an off-hook condition is detected). The predetermined number of the samples may vary. For example, in some embodiments, the predetermined number of the samples may range between 5 and 50. Alternatively or additionally, the predetermined number of the samples may vary between 15 and 25. Alternatively or additionally, the predetermined number of the samples may vary based on the predetermined length of each of the samples. For example, when the predetermined length of each of the samples is shorter, the predetermined number of samples may be larger. In some embodiments, the predetermined length of each of the samples may range between 0.01 seconds and 0.5 seconds. Alternatively or additionally, the predetermined length of each of the samples may range between 0.05 seconds and 0.2 seconds.

The volume determinations 200 and 300 may then be performed on the samples. The volume determinations 200 and 300 may be accomplished using any one of a variety of methods. For example, the volume determinations 200 and 300 may be accomplished by measuring the volume of each sample. Because each sample spans a length of time (e.g., 0.1 seconds), the measurement of the incoming audio may occur at a single point in time during the length of time. Additionally or alternatively, the measurement of incoming audio may include measuring volumes of the sample at discrete time intervals (e.g., every 20 milliseconds) in the sample and then considering the maximum measured volume or the minimum measured volume to be the volume determination of the incoming audio of the sample. For example, in these and other embodiments, five measurements may be taken during a given sample. The maximum or minimum of the five measurements may be the volume determination of the incoming audio of the given sample.

In another example, the volume determinations 200 and 300 may be accomplished using volume measurement and a root-mean-square (RMS) volume calculation. This RSM volume calculation may include, for each of the samples, measuring volumes of the sample at discrete time intervals (e.g., every 20 milliseconds) in the sample, normalizing the measured volumes to a 0-to-1 scale and squaring each of the normalized volumes. The RSM volume calculation may also include adding the squared volumes together to arrive at a sum and dividing the sum by the number of discrete time intervals in the sample to arrive at a quotient. The RSM volume calculation may also include taking the log base 10 of the quotient to arrive at a first answer and multiplying the first answer by 20 to arrive at the volume of the sample. The volume of the sample may be expressed in decibels (dB), for example.

Modifications, additions, or omissions may be made to the volume determinations 200 and 300 without departing from the scope of the present disclosure. For example, in some embodiments, the volume determinations 200 and 300 may include taking a mean, a median, or a mode of multiple volume measurements taken at discrete time intervals in each of the samples.

In these and other embodiments, once the volume determinations 200 and 300 have been made, it may be determined whether a threshold number of the samples are at or above a threshold volume. The threshold number may be determined by testing various non-standard dial tones to determine a safe number of above-threshold-volume samples across all non-standard dial tones. The threshold number may also be adjusted depending on the time period of the samples. For example, where the time period of the samples is longer, the threshold number may be lower or higher.

Four samples in FIG. 2 are at or above the threshold volume 202 of about −55 dB, namely, the four samples taken from 0.3-0.4 seconds, 0.7-0.8 seconds, 1.5-1.6 seconds, and 1.9-2.0 seconds. In contrast, only two samples in FIG. 3 are at or above the threshold volume 302 of about −55 dB, namely, the two samples taken from 0.3-0.4 seconds and 1.5-1.6 seconds. Where the threshold number is four, it may be determined that the threshold number of four samples is reached for samples in FIG. 2 being at or above the threshold volume 202 of about −55 dB. In contrast, it may be determined that the threshold number of four samples is not reached for samples in FIG. 3 being at or above the threshold volume 302 of about −55 dB. The threshold volume for incoming audio that immediately follows detection of an off-hook event on the telephone line may be a volume of incoming audio on a telephone line below which an incoming audio can be safely assumed to be line noise or static, and at or above which an incoming audio can be safely assumed to be a dial tone. In some embodiments, the threshold volume may be −55 dB. Alternately or additionally, the threshold volume may vary. For example, the threshold volume may range between −45 and −65 dB. Alternatively or additionally, the threshold volume may range between −50 dB and −60 dB.

Figure 4:
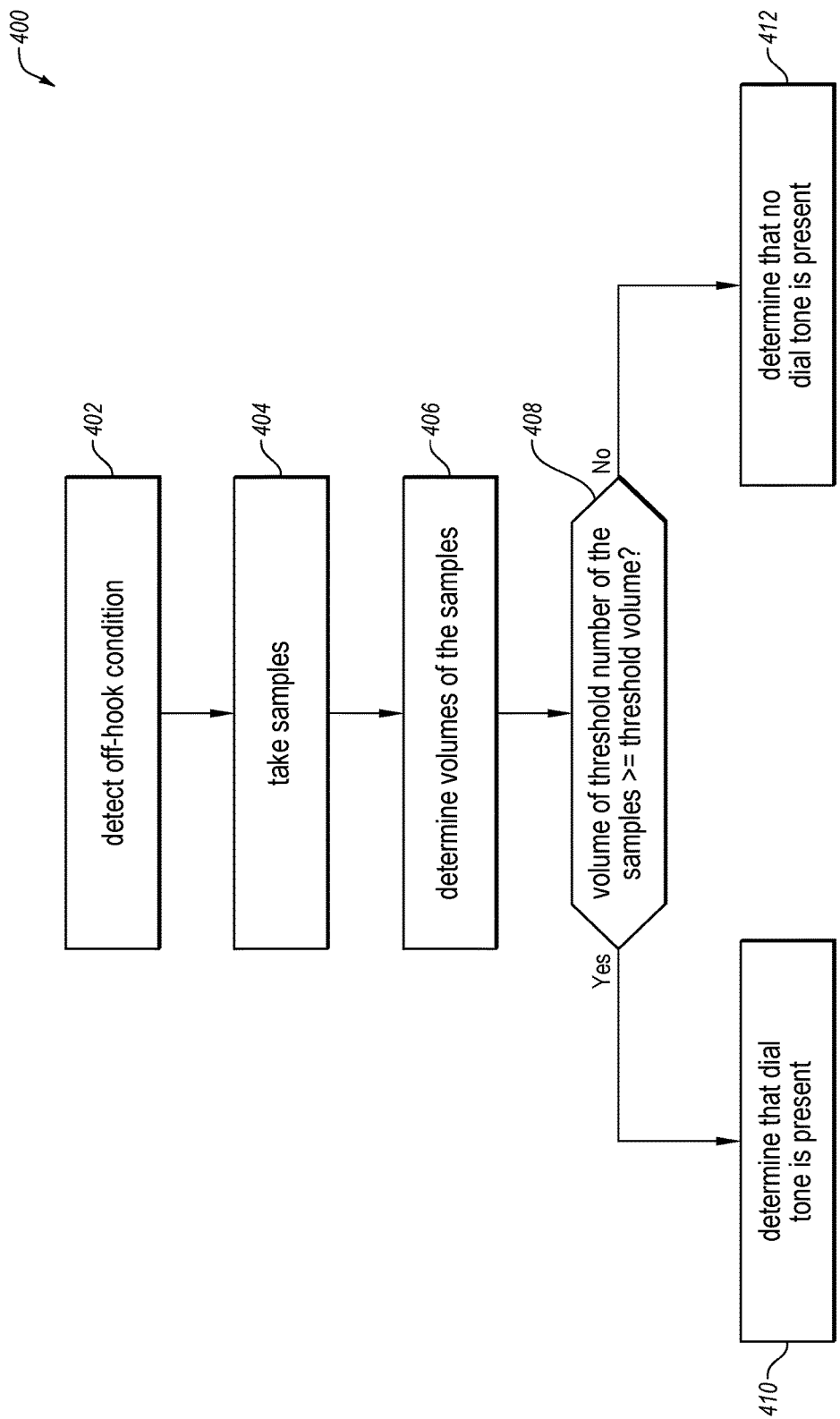
FIG. 4 is a flowchart of an example method to detect dial tone on a telephone line.

FIG. 4 is a flowchart of an example method 400 to detect dial tone on a telephone line. The method 400 may be arranged in accordance with at least one embodiment described in the present disclosure. The method 400 may be performed, in some embodiments, by a device or system, such as the device 120 and/or an external system. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where an off-hook condition on a telephone line may be detected. In block 404, samples of incoming audio on the telephone line may be taken. In some embodiments, a predetermined number of samples of the incoming audio on the telephone line may be taken with each sample having a predetermined length, such as about twenty samples with each sample having a length of about one-tenth of one second as disclosed in FIGS. 2 and 3.

In block 406, volumes of the samples may be determined. In some embodiments, the volumes of the samples may be determined using any of the methods disclosed in connections with FIGS. 2 and 3. In block 408, it may be determined whether the volumes of a threshold number of the samples are at or above a threshold volume, such as the threshold volume of about −55 dB as disclosed in FIGS. 2 and 3. The threshold volume may be a volume below which an incoming audio can be safely assumed to be line noise or static, and at or above which an incoming audio can be safely assumed to be a dial tone.

In block 410, in response to determining that the volumes of a threshold number of the samples are at or above a threshold volume, the incoming audio on the telephone line may be determined to include a dial tone. For example, where the threshold number is four and the threshold volume is about −55 dB, it may be determined that the threshold number of four samples is reached for samples in FIG. 2 being at or above the threshold volume 202 of about −55 dB, since four samples in FIG. 2 are at or above the threshold volume 202 of about −55 dB, namely, the four samples taken from 0.3-0.4 seconds, 0.7-0.8 seconds, 1.5-1.6 seconds, and 1.9-2.0 seconds.

Alternatively, in block 412, in response to determining that the volumes of a threshold number of the samples are not at or above a threshold volume, the incoming audio on the telephone line may be determined to not include a dial tone. For example, where the threshold number is four and the threshold volume is about −55 dB, it may be determined that the threshold number of four samples is not reached for samples in FIG. 3 being at or above the threshold volume 302 of about −55 dB, since only two samples in FIG. 3 are at or above the threshold volume 302 of about −55 dB, namely, the two samples taken from 0.3-0.4 seconds and 1.5-1.6 seconds.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the block 402 of the method 400 may include taking samples of the incoming audio on the telephone line only until the threshold number of samples are taken that are at or above the threshold volume, even if a predetermined number of samples is not yet taken. Additionally or alternatively, in some embodiments, the total volume during the sampling time period may be compared to a total volume threshold in order to determine whether the incoming audio includes a dial tone. For example, the volume determinations during the sampling time period, such as the twenty volume determinations in FIG. 2 or FIG. 3, may be summed and the sum may be compared to a total volume threshold to determine whether the incoming audio includes a dial tone.

Additionally or alternatively, in some embodiments, the method 400 may be employed in parallel with other dial tone detection processes which, among other things, examine the frequency of incoming audio to detect standard dial tones. In these embodiments, if the other dial tone detection processes fail to detect a standard dial tone, any dial tone detected by the parallel method 400 may be determined to be a non-standard dial tone. In these embodiments, the other dial tone processes may be employed in such a way that if they detect a standard dial tone prior to the completion of the method 400 (since the detection of a particular frequency or particular frequencies of incoming audio may be faster than taking multiple samples of incoming audio and making volume determinations on the samples), the method 400 may be terminated early in order to avoid unnecessary processing in the method 400. Additionally or alternatively, in some embodiments, the method 400 may be employed in parallel with other fast busy tone (also known as reorder tone) detection processes. In these embodiments, the other fast busy tone detection processes may be employed in such a way that if they detect a fast busy tone prior to the completion of the method 400 (since the detection of a fast busy tone may be faster than taking multiple samples), the method 400 may be terminated early in order to avoid incorrectly identifying a fast busy tone as a dial tone.

Further, it is understood that the method 400 may improve the functioning of a telephone itself. For example, the functioning of the device 120 of FIG. 1 (e.g., where the device 120 is a telephone) may itself be improved by the method 400 at least because a dial tone on a telephone line associated with the device 120 may be more accurately detected using the method 400 than using prior art dial tone detection processes.

Also, the method 400 may improve the technical field of telecommunications. For example, the technical field of telecommunications may be improved by the method 400 at least because prior art dial tone detection processes did not enable automated equipment to automatically detect a non-standard, yet nevertheless valid, dial tone based on the volume of incoming audio on a telephone line regardless of the frequency of the incoming audio. The ability to detect non-standard dial tones based on the volume of incoming audio may decrease errors associated with failing to recognize a valid dial tone, such as failing to initiate a telephone call and/or begin captioning or other assistance with respect to a telephone call.

Figure 5:
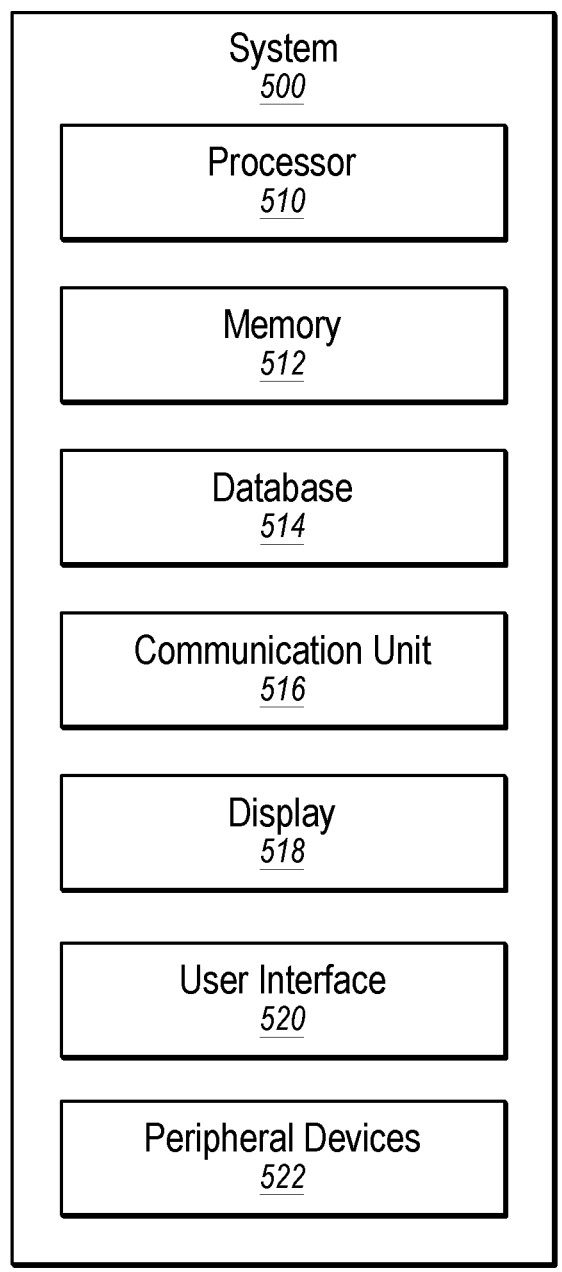
FIG. 5 illustrates an example computing system that may be used in detecting dial tone on a telephone line.

FIG. 5 illustrates an example computing system 500 that may be used in detecting dial tone on a telephone line. The system 500 may be arranged in accordance with at least one embodiment described in the present disclosure. The system 500 may include a processor 510, a memory 512, a database 514, a communication unit 516, a display 518, a user interface unit 520, and a peripheral device 522, which all may be communicatively coupled. In some embodiments, the system 500 may be part of any of the system or devices described in this disclosure. For example, the system 500 may be part of the device 120 of FIG. 1 or the administrative system 632 of FIG. 6.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512, the database 514, or the memory 512 and the database 514. In some embodiments, the processor 510 may fetch program instructions from the database 514 and load the program instructions into the memory 512.

After the program instructions are loaded into the memory 512, the processor 510 may execute the program instructions. For example, the system 500 may be part of the device 120 of FIG. 1. In these and other embodiments, the instructions may include the processor 510 detecting dial tone on a telephone line.

The memory 512 and the database 514 may include computer-readable storage media for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations, such as one or more of the volume determinations 200 and 300 and/or one or more blocks of the method 400.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 516 may permit data to be exchanged with a network and/or any other devices or systems described in the present disclosure.

The display 518 may be configured as one or more displays, like an LCD, LED, or other type display. The display 518 may be configured to present video, text captions, user interfaces, and other data as directed by the processor 510.

The user interface unit 520 may include any device to allow a user to interface with the system 500. For example, the user interface unit 520 may include a mouse, a track pad, a keyboard, a touchscreen, a telephone switch hook, and/or a telephone keypad, among other devices. The user interface unit 520 may receive input from a user and provide the input to the processor 510.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure.

Figure 6:
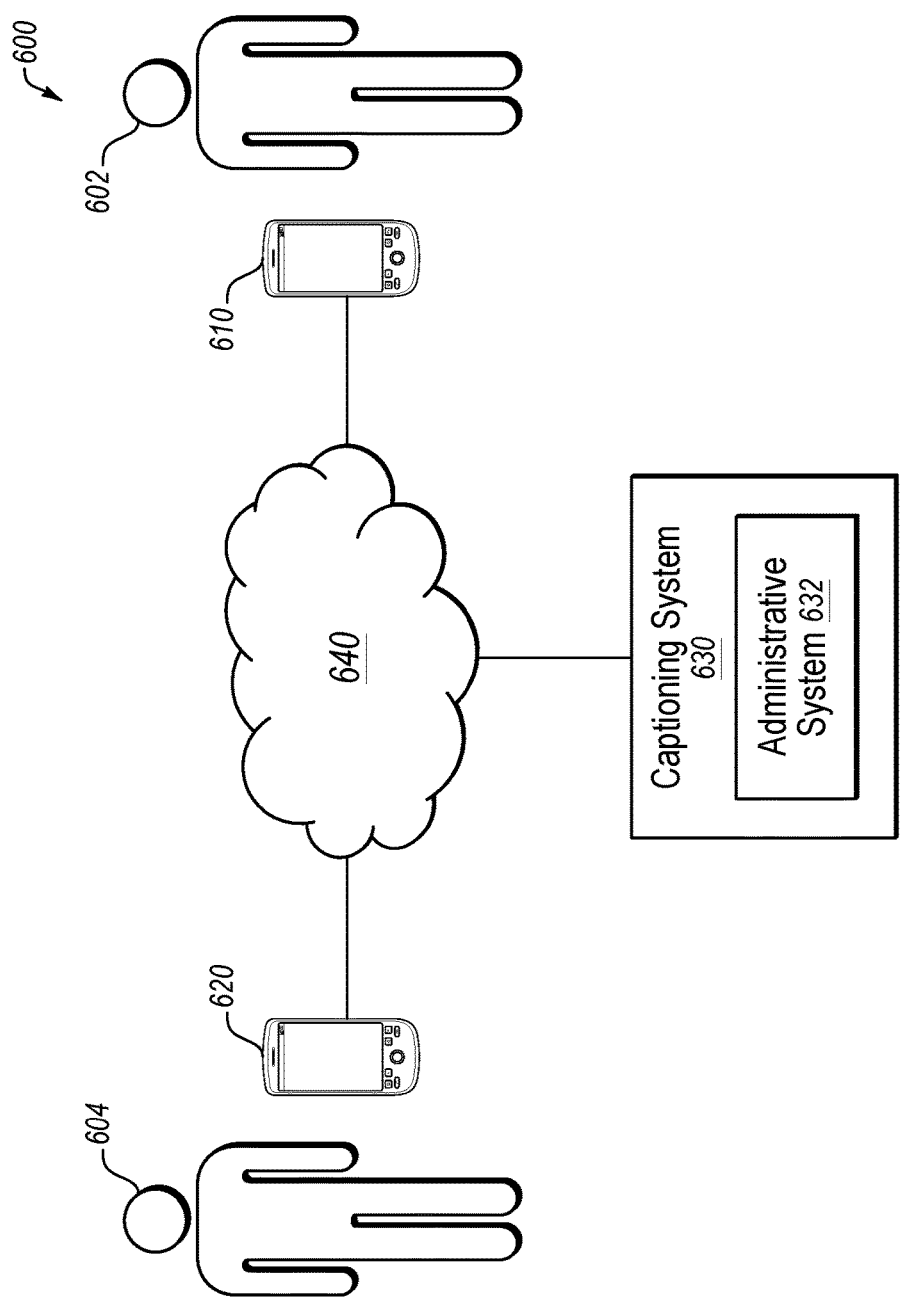
FIG. 6 illustrates an example communication system that may include a device configured to detect dial tone on a telephone line.

FIG. 6 illustrates an example communication system 600 that may include a device configured to detect dial tone on a telephone line. The communication system 600 may be arranged in accordance with at least one embodiment described in the present disclosure. The communication system 600 may include a first device 610, a second device 620, and a captioning system 630 that includes an administrative system 632. The first device 610 and the captioning system 630 may be communicatively coupled by the network 640. Alternately or additionally, the first device 610 and the second device 620 may be communicatively coupled by the network 640.

As illustrated, the first device 610 may be analogous and include the functionality of the device 120 of FIG. 1. FIG. 6 illustrates an example of the additional services that the administrative system 632 may provide to the first device 610. The network 640 may be analogous to the network 110 and no further description is provided with respect to FIG. 6.

In some embodiments, the communication system 600 illustrated may be configured to facilitate an assisted call between a hearing-impaired user 602 and a second user 604. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, a communication session may be established between the first device 610 and the second device 620. In these and other embodiments, the communication session may be a captioning communication session. The first device 610 may only initiate the captioning communication session after the first device 610 has detected a dial tone on a telephone line associated with the first device 610 as explained in the present disclosure.

The captioning system 630 may be an assistive service, which is intended to permit a hearing-impaired person to utilize a communication network and assist their understanding of a conversation by providing text captions to supplement voice conversation occurring during communication sessions with other devices, such as the second device 620.

During a captioning communication session, the captioning system 630 and the first device 610 maybe be communicatively coupled using networking protocols. In some embodiments, during the communication session between the first device 610 and the second device 620, the first device 610 may provide the audio signal from the second device 620 to the captioning system 630.

At the captioning system 630, a call assistant may listen to the audio signal of the second user 604 and "revoice" the words of the second user 604 to a speech recognition computer program tuned to the voice of the call assistant. In these and other embodiments, the call assistant may be an operator who serves as a human intermediary between the hearing-impaired user 602 and the second user 604. In some embodiments, text captions may be generated by the speech recognition computer as a transcription of the audio signal of the second user 604. The text captions may be provided to the first device 610 being used by the hearing-impaired user 602 over the network 640. The first device 610 may display the text captions while the hearing-impaired user 602 carries on a normal conversation with the second user 604. The text captions may allow the hearing-impaired user 602 to supplement the voice signal received from the second device 620 and confirm his or her understanding of the words spoken by the second user 604.

Modifications, additions, or omissions may be made to the communication system 600 without departing from the scope of the present disclosure. For example, in some embodiments, the second user 604 may be hearing impaired. In these and other embodiments, the captioning system 630 may provide text captions to the second device 620 based on audio data transmitted by the first device 610. Alternately or additionally, the captioning system 630 may include additional functionality. For example, the captioning system 630 may edit the text captions or make other alterations to the text captions after presentation of the text captions on the first device 610.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 512 or database 514 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to detect dial tone on a telephone line, the method comprising:
    detecting an off-hook condition on a telephone line coupled to a telephonic system;
    in response to detecting the off-hook condition, taking, at the telephonic system, a plurality of samples of incoming audio from the telephone line, each of the plurality of samples being between one-twentieth of one second and one-fifth of one second;
    determining a volume of each of the plurality of samples;
    determining a number of the plurality of samples where the volume of each of the plurality of samples included in the number of the plurality of samples are at or above a threshold volume that is between −50 and −60 dB;
    comparing the number of the samples with a threshold number; and
    in response to the number of the samples being at or above the threshold number, determining that the incoming audio from the telephone line includes a dial tone.

2. The method of claim 1, wherein the dial tone is a non-standard dial tone that is a stutter dial tone, has a volume that is less than a standard dial tone, or includes a musical tune, or some combination thereof.

3. The method of claim 1, wherein the plurality of samples taken is a particular number of samples where each of the plurality of samples has a particular length, wherein the particular number of samples is larger than four.

4. The method of claim 3, wherein
    the threshold volume is about −55 dB;
    the particular number of samples is about twenty; and
    the particular length of each of the samples is about one-tenth of one second.

5. The method of claim 1, wherein determining the volume for at least one sample of the plurality of samples includes:
    measuring a plurality of volumes at discrete time intervals in the at least one sample; and
    manipulating the plurality of volumes at the discrete time intervals of the at least one sample to arrive at the volume of the at least one sample.

6. The method of claim 5, wherein manipulating the plurality of volumes at the discrete time intervals of the at least one sample to arrive at the volume of the at least one sample includes:
    adding the plurality of volumes together to arrive at a sum; and
    dividing the sum by a number of discrete time intervals in the sample to arrive at a quotient.

7. The method of claim 5, wherein manipulating the plurality of volumes at the discrete time intervals of the at least one sample to arrive at the volume of the at least one sample includes:
    normalizing the plurality of volumes to a 0-to-1 scale;
    squaring each of the normalized volumes;
    adding the squared volumes together to arrive at a sum; and
    dividing the sum by a number of discrete time intervals in the sample to arrive at a quotient.

8. At least one non-transitory computer readable media configured to store one or more instructions that when executed by at least one computing system cause or direct the computing system to perform the method of claim 1.

9. The telephonic system of claim 1, comprising:
    a computing system including a switch hook and a telephone keypad; and
    at least one non-transitory computer-readable media configured to store one or more instructions that when executed by the computing system cause or direct the computing system to perform the method of claim 1.

10. A telephonic system configured to detect dial tone on a line, the telephonic system comprising:
    a computing system; and at least one non-transitory computer-readable media configured to store one or more instructions that when executed by the computing system cause or direct the computing system to perform operations, the operations comprising:
  detect an off-hook condition on a telephone line;
  in response to detection of the off-hook condition, take a particular number of samples of incoming audio on the telephone line with each sample having a particular length;
  determine volumes of each of the samples, including:
    measure a plurality of volumes at discrete time intervals in at least one of the samples; and
    manipulate the plurality of volumes at the discrete time intervals of the at least one of the samples to arrive at the volume of the at least one of the samples;
  determine a number of the samples where the volume of the samples included in the number of the samples are at or above a threshold volume;
  compare the number of the samples, where the volume of the samples are at or above the threshold volume, with a threshold number; and
  in response to the number of the samples being at or above the threshold number, determine that the incoming audio on the telephone line includes a dial tone.

11. The telephonic system of claim 10, wherein the dial tone is a non-standard dial tone that is a stutter dial tone, has a volume that is less than a standard dial tone, or includes a musical tune, or some combination thereof.

12. The telephonic system of claim 10, wherein:
the threshold volume is between −50 and −60 dB;
the particular number of samples is greater than four; and
the particular length of each of the samples is between one-twentieth of one second and one-fifth of one second.

13. The telephonic system of claim 10, wherein the particular number of samples are taken immediately following detection of the off-hook condition.

14. The telephonic system of claim 10, wherein the off-hook condition occurs in response to detection of a handset lifted off of a base included in the telephonic system or detection of pressing of a button included in telephonic system.

15. A method to detect dial tone on a line, the method comprising:
  taking, at a telephonic system, a sample of incoming audio from a telephone line coupled to the telephonic system;
  determining a volume of the sample;
  classifying the sample as a high volume sample when the volume is at or above a threshold volume;
  repeating the steps of: taking the sample, determining the volume, and classifying the sample until:
    a number of samples taken of the incoming audio from the telephone line is greater than a first threshold number or
    a number of the high volume samples is greater than a second threshold number, wherein the second threshold number is less than the first threshold number; and
  in response to the number of the high volume samples being greater than the second threshold number, determining that the incoming audio on the telephone line includes a dial tone.

16. The method of claim 15, wherein when the number of samples taken of the incoming audio from the telephone line is greater than the first threshold number it is determined that the incoming audio on the telephone line does not include the dial tone.

17. The method of claim 15, wherein:
the method is employed in parallel with another dial tone detection process which examines a frequency of the incoming audio to determine that the incoming audio includes a standard dial tone; and
it is determined that the incoming audio on the telephone line includes the dial tone if either the method or the other dial tone detection process determines that the incoming audio on the telephone line includes the dial tone.

18. The method of claim 15, wherein determining the volume for the sample includes:
  measuring a plurality of volumes at discrete time intervals in the sample; and
  manipulating the plurality of volumes at the discrete time intervals of the sample to arrive at the volume of the sample.

19. The method of claim 15, further comprising detecting an off-hook condition on the telephone line coupled to the telephonic system, wherein the sample is taken in response to detection of the off-hook condition.

20. At least one non-transitory computer readable media configured to store one or more instructions that when executed by at least one computing system cause or direct the computing system to perform the method of claim 15.

* * * * *